United States Patent Office 3,301,924
Patented Jan. 31, 1967

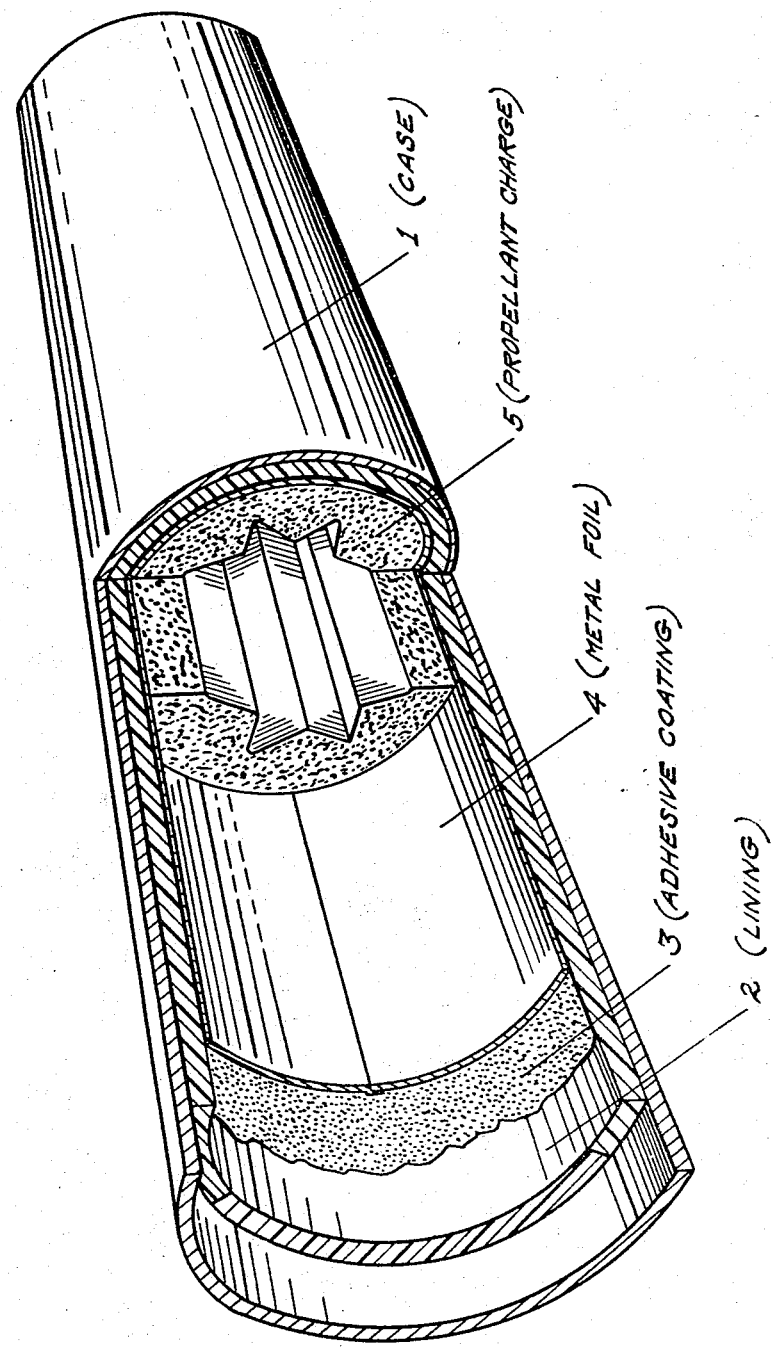

3,301,924
MANUFACTURE OF ROCKET MOTORS
Robert William Bryant, 2 Thaxted Way, Waltham Abbey, Essex, England, and Barry Hilton Newman, 3100 Massachusetts Ave. NW., Washington, D.C. 20008
Filed July 16, 1964, Ser. No. 390,771
6 Claims. (Cl. 264—3)

The present invention relates to the manufacture of rocket motors which consist essentially of a lined rocket casing around a propellant charge.

The linings of rocket motors are often fairly complex and comprise layers of material usually completely or partially bonded between the rocket case and the propellant charge, in order for example, to insulate the propellant from aerodynamic heating and the rocket case from the heat of combustion of the propellant, confine burning to other surfaces of the propellant charge and to relieve strains caused by differential thermal expansion or contraction between the case and the propellant.

Hitherto propellant charges having a polyurethane or polybutadiene binder have been subject to failure on ignition because of the breakdown of the bond between the propellant charge and the lining materials.

The object of the present invention is to provide a process which bonds a propellant charge having a polyurethane or polybutadiene binder to the lining of a rocket motor casing so effectively that the rocket does not fail in service through breakdown of the bond, and whereby any substance present in the lining of the rocket casing that may be deleterious to the propellant is prevented from attacking it by an impermeable barrier.

In accordance with the invention, in the manufacture of a rocket motor having a propellant charge with a polyurethane or polybutadiene binder and a lined casing, the inner surface of the lining is faced with a layer of metal foil in the form of a continuous imperforate sheet and the propellant charge is cast in direct contact with the metal foil. The metal foil can be made to adhere to the lining by a suitable adhesive and the propellant charge bonds to the metal foil provided this is clean.

One of the principal reasons for the weak bond hitherto experienced between the propellant charge and the lining material is that small amounts of water in the lining materials cross the interface between the lining material and the propellant charge and interfere with the curing process of the propellant, resulting in a layer of imperfectly cured propellant adjacent to the lining material.

Depending upon the nature of the lining material, substances other than water such as ammonia, formaldehyde, phenols, amines and organic acids, may cross the interface between the lining materials and the propellant charge and interfere with the curing process.

The present invention readily provides a very convenient method of sealing the lining material so that any water, or other substance deleterious to the curing process of the propellant, present in the lining material is prevented from attaching the propellant charge and interfering with the curing process.

The number of failures of the bond between the lining material and the propellant in rocket motors may be reduced by rigorous drying of the linings, but this is a very prolonged process (taking up to a year in some cases) if the linings are more than 0.5 inch thick, and in any case the drying process requires the application of both a high vacuum and temperatures in the region of 100° C.

The metal foil used may be of any metal that does not react with any of the components of the lining material or of the propellant charge and it has been found in practice that foil made of aluminium is satisfactory and good results can be obtained with foil having a thickness between about 2 and 5 thousandths of an inch. Alternative metal foils which may be used are tin and copper foils.

When an "impact" adhesive is used to bind the metal foil to the lining material the bond obtained can be stronger than the propellant. Suitable adhesives are synthetic rubber resin based adhesives, for example neoprene-based adhesives, and Evo-Stik 528 has been found to be convenient in practice.

One procedure by which aluminium foil may be attached to the lining materials of rocket motors will now be described by way of example only with reference to the accompanying drawing which is a progressively cut back perspective view of a rocket motor constructed in accordance with the invention.

The two surfaces to be joined, i.e., the lining material 2 and the foil 4, are degreased by wiping with a cloth damped with ethyl methyl ketone followed by a second treatment with a fresh cloth and fresh solvent. A coating 3 of adhesive, such as Evo-Stik 528, is applied to each of the surfaces to be bonded (the lining material first) with a brush, care being taken to eliminate bubbles as far as is possible. After coating, the surfaces are allowed to dry for 20 minutes before bonding. The area of surface bonded at any one time is such that the operation is completed in about 40 minutes. The foil is applied to the lining material with the edges overlapping and any excess adhesive is removed from the surface of the aluminium.

After the rocket lining is completely covered a pressure bag is inserted in the casing 1 and inflated so as to press the aluminium foil into intimate contact with the lining to ensure a good bond. The pressure exerted should not be excessive in order to avoid distension of the lining and rupture of the aluminium foil.

In order finally to check the bond between the aluminium foil and the lining material, the casing is evacuated, when any bond failures due to trapped air or solvent show up as blisters. The blistered aluminium foil is cut away and patches applied as described above, a further evacuation test being applied as a check.

Once the aluminium foil has been properly bonded to the lining materials, the propellant charge 5 is filled into the rocket casing in a conventional manner, as by casting a charge having a polyurethane or polybutadiene binder about an internal former and in contact with the foil.

In order to illustrate the effectiveness of the improved manufacturing process typical propellants having a polyurethane binder and about 80% solids loading including aluminium were bonded to typical lining materials with and without an aluminium foil seal.

The lining materials selected for test were Durestos, which is a phenolic resin containing asbestos, and materials based on Hypalon, which is chlorosulphonated polyethylene, and the adhesive used was Evo-Stik 528. The strength of the bond between the propellant and a clean steel surface was also measured as a control. Different polyurethane binders were used in the propellants used for testing Durestos and Hypalon binders.

Recorded values of the bond strength in lbs./sq. in. measured in tension are as follows.

| Lining | Mean Bond Strength— | | |
|---|---|---|---|
| | Without Aluminium | With Aluminium | To Steel (Control) |
| Durestos | 7 | 73 | 92 |
| Hypalon Compound CL 2759 | 16 | 46 | 42 |
| Hypalon Compound EHT 6344 | 16 | 42 | 42 |

We claim:
1. A process for the manufacture of a rocket motor which includes the steps of lining the inside of the rocket casing with a lining material, facing the inner surface of said lining material with a layer of metal foil and bonding said layer to said inner surface, and casting a propellant charge having a polyurethane or polybutadiene binder in contact with the metal foil whereby the metal foil forms a continuous and impermeable barrier between the lining material and the propellant charge.

2. A process according to claim 1 in which the said metal foil is aluminium foil.

3. A process according to claim 2 wherein the said aluminium foil is between and 2 and 5 thousandths of an inch thick.

4. A process according to claim 1 wherein the said lining material consists essentially of a phenolic resin containing asbestos.

5. A process according to claim 1 wherein the said lining material consists essentially of a chlorosulphonated polyethylene.

6. A process according to claim 1 wherein the said metal foil is bonded to the said lining material by means of an adhesive.

References Cited by the Examiner

UNITED STATES PATENTS

| | | | |
|---|---|---|---|
| 2,977,885 | 4/1961 | Perry et al. | 102—98 |
| 3,090,196 | 5/1963 | Brewer | 102—98 |
| 3,170,291 | 2/1965 | Adelman | 102—98 |
| 3,176,618 | 4/1965 | Forsberg et al. | 264—3 |

BENJAMIN R. PADGETT, *Acting Primary Examiner.*

L. DEWAYNE RUTLEDGE, *Examiner.*